United States Patent
Yamajo et al.

(10) Patent No.: US 8,601,042 B2
(45) Date of Patent: Dec. 3, 2013

(54) SIGNAL PROCESSING DEVICE AND METHOD, AND SIGNAL PROCESSING PROGRAM

(75) Inventors: Hiroaki Yamajo, Tokyo (JP); Koji Aoyama, Saitama (JP)

(73) Assignee: Sony Corporation, Tokyo (JP)

( * ) Notice: Subject to any disclaimer, the term of this patent is extended or adjusted under 35 U.S.C. 154(b) by 927 days.

(21) Appl. No.: 12/415,514

(22) Filed: Mar. 31, 2009

(65) Prior Publication Data
US 2009/0247108 A1 Oct. 1, 2009

(30) Foreign Application Priority Data

Apr. 1, 2008 (JP) ................. P2008-094846

(51) Int. Cl.
*G06F 17/10* (2006.01)
(52) U.S. Cl.
USPC .......................................... 708/300
(58) Field of Classification Search
USPC .......................................... 708/300
See application file for complete search history.

(56) References Cited

U.S. PATENT DOCUMENTS

| | | | | |
|---|---|---|---|---|
| 5,483,474 A | * | 1/1996 | Arbeiter et al. | 708/300 |
| 5,920,654 A | * | 7/1999 | Someya et al. | 382/270 |
| 2006/0256123 A1 | * | 11/2006 | Miyagi | 345/581 |
| 2007/0053024 A1 | * | 3/2007 | Kitao | 358/518 |

FOREIGN PATENT DOCUMENTS

| | | |
|---|---|---|
| JP | 2004-336651 | 11/2004 |
| JP | 2005-318614 | 11/2005 |
| WO | WO 98/54892 | 12/1998 |

* cited by examiner

*Primary Examiner* — Henry Tsai
*Assistant Examiner* — Aurangzeb Hassan
(74) *Attorney, Agent, or Firm* — Finnegan Henderson Farabow Garrett & Dunner LLP

(57) ABSTRACT

Provided is a signal processing device performing filter processing operations on an input signal using a plurality of filters to generate an output signal, including a filter processing unit configured to perform a filter processing operation on the input signal using a filter and a generating unit configured to generate the output signal by adding a correction value determined on the basis of each sign and each absolute value of each difference between each of filtered output signals obtained by the filter processing operations performed using a plurality of the above mentioned filter processing units and the input signal, to the input signal.

10 Claims, 10 Drawing Sheets

SIGNAL PROCESSING DEVICE AND METHOD, AND SIGNAL PROCESSING PROGRAM

BACKGROUND OF THE INVENTION

1. Field of the Invention

The present invention relates to a signal processing device and method, and a signal processing program used therein and more particularly to a signal processing device and method, and a signal processing program used therein realizing more ready and sure noise removal.

2. Description of the Related Art

As a method of removing noise from an input signal by performing filter processing, a method in which a plurality of filter processing units are series-coupled to perform a plurality of filter processing operations in series (hereinafter, referred to as a method of series-coupling a plurality of filter processing operations) is well known. Series-coupling a plurality of filter processing operations may cause an increase in capacity of memory necessary for holding input signals in terms of hardware and may cause an increase in processing time which is difficult to divide in terms of software. In addition, in the case that a plurality of filter processing operations are series-coupled, it may sometimes occur that an appropriate filter processing operation is not performed on an input signal at a succeeding stage, due to the influence of a change in the input signal induced by a filter processing operation performed at a previous stage.

Thus, methods in which a plurality of filter processing units are parallel-coupled to perform a plurality of filter processing operations in parallel (hereinafter, referred to as a method of parallel-coupling a plurality of filter processing operations) have been proposed. As examples of such methods, mainly, the following three methods are well known.

As the first method, there is a method of realizing parallel-coupling of a plurality of filter processing operations by calculating a running average using input signals on which a plurality of filter processing operations have been performed respectively using a plurality of filters. As the second method, there is a method of obtaining a difference between an input signal and an input signal on which a filter processing operation has been performed for each filter to add the difference obtained for each filter processing operation to the input signal.

As the third method, there is a method of switching a filter used for a filter processing operation for each region of an input image formed on the basis of an input signal. As an example of the third method, there has been proposed a method in which an input image is divided into pixel blocks and a filter for block noise reduction is switched to a filter for mosquito noise reduction or vice versa for each pixel block to perform a filter processing operation using either one of these filters to reduce artifacts appearing on the input image, for example, as disclosed in Japanese Laid-Open Patent Publication No. 2005-318614.

SUMMARY OF THE INVENTION

However, it has been difficult to readily and surely remove noise from an input signal for the above mentioned techniques of parallel-coupling a plurality of filter processing operations.

For example, in the first method, since parallel-coupling of the plurality of filter processing operations is realized by obtaining the running average, the more the number of filter processing operations to be parallel-coupled is increased, the more the noise removing effect is reduced. In the second method, since each difference is simply added to the input signal, the effect brought about by another filter processing operation is canceled by execution of a predetermined filter processing operation and hence unintended adverse effects and artifacts may be induced.

In addition, in the third method, since the filter used is switched for each region, a boundary between adjacent regions on the input image may become artificial. Further, in the case that a filter processing operation is performed on an animated image by the third method, a filter processing operation which is different for different time (frame) is performed on a region of the same part of the input image and hence the time-directional stability of the filter processing operation may be reduced.

The present invention has been conceived of in view of the above mentioned circumstances so as to remove noise more readily and surely than would have been ever realized.

According to an embodiment of the present invention, there is provided a signal processing device for performing filter processing operations on an input signal using a plurality of filters to generate an output signal, including filter processing means for performing a filter processing operation on the input signal using a filter and generating means for generating the output signal by adding a correction value determined on the basis of each sign and each absolute value of each difference between each of filtered output signals obtained by the filter processing operations performed using a plurality of the above mentioned filter processing means and the input signal, to the input signal.

In the case that, among differences between each of the filtered output signals and the input signal, the product of a difference of a maximum value and a difference of a minimum value is zero or more, the generating means may define one of the difference of a maximum value and the difference of a minimum value which has a larger absolute value as the correction value.

In the case that, among differences between each of the filtered output signals and the input signal, the product of a difference of a maximum value and a difference of a minimum value is less than zero, the generating means may define the sum of the difference of the maximum value and the difference of the minimum value as the correction value.

First filter processing means of the plurality of filter processing means may perform the filter processing operation using a filter for performing smoothing processing and a second filter processing means of the plurality of filter processing means may perform the filter processing operation using a filter having an edge saving property.

According to an embodiment of the present invention, there is provided a signal processing method or a signal processing program for performing filter processing operations on an input signal Using a plurality of filters to generate an output signal, including the steps of performing a filter processing operation on the input signal by means of filter processing means using a filter and generating the output signal by adding a correction value determined on the basis of each sign and each absolute value of each difference between each of filtered output signals obtained by the filter processing operations performed using a plurality of the above mentioned filter processing means and the input signal, to the input signal.

According to an embodiment of the present invention, a filter is used by a filter processing unit to perform a filter processing operation on an input signal and a correction value determined on the basis of each sign and each absolute value of each difference between each of filtered output signals obtained by the filter processing operations performed by means of a plurality of filter processing units and the input signal is added to the input signal to generate an output signal.

According to an embodiment of the present invention, noise may be removed more readily and surely than would have been ever realized.

DESCRIPTION OF THE PREFERRED EMBODIMENTS

Next, preferred embodiments of the present invention will be described with reference to the accompanying drawings.

Figure 1:
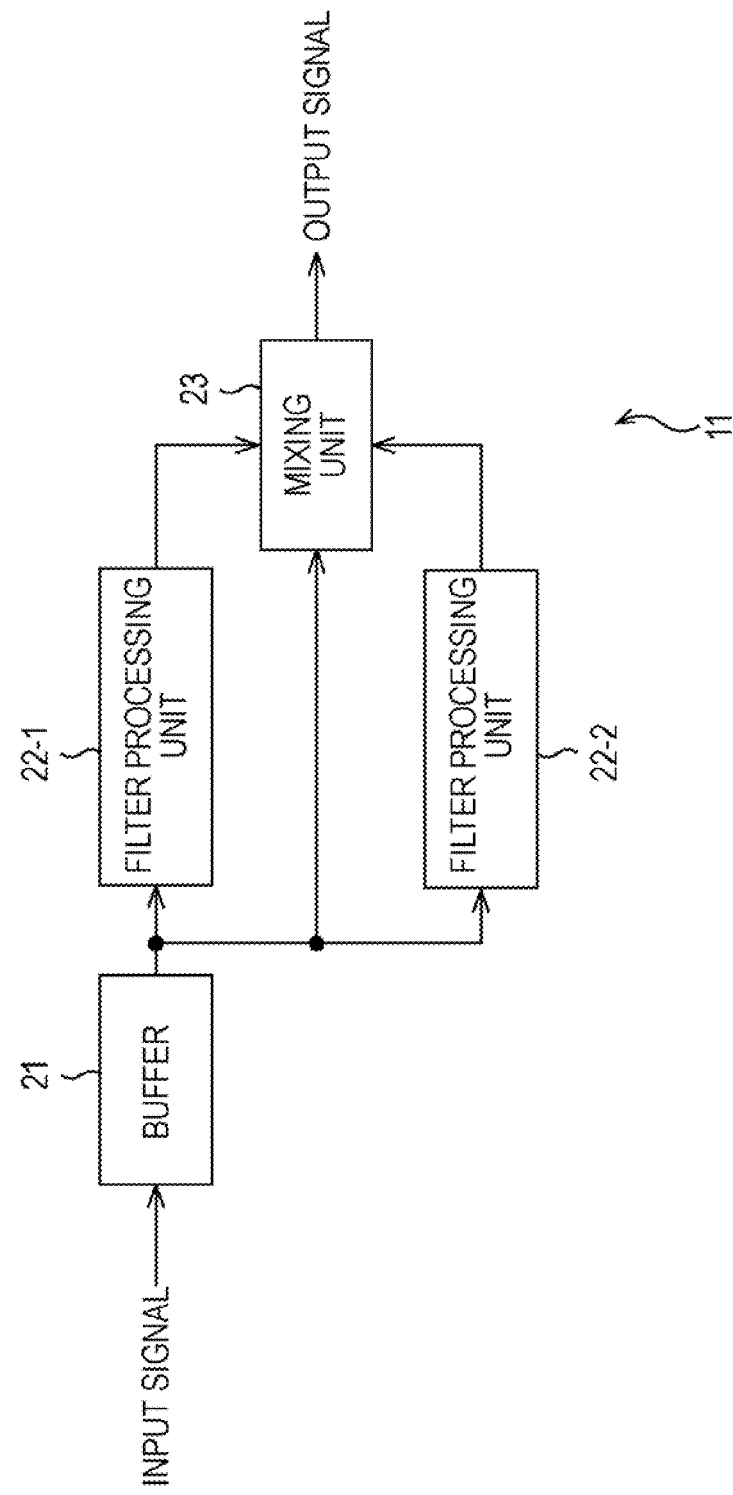
FIG. 1 is a block diagram showing a structural example of an embodiment of a signal processing device to which the present invention is applied.

FIG. 1 is a block diagram showing a structural example of one embodiment of a signal processing device to which the present invention is applied.

A signal processing device 11 includes a buffer 21, a filter processing unit 22-1, a filter processing unit 22-2 and a mixing unit 23.

An input signal from which noise is to be removed is supplied to the buffer 21. This input signal is a signal having consecutive signal values and may be, for example, an image signal of a static image or an animated image. In the case that the input signal is an image signal, signal values of the input signal indicate pixel values of pixels on an image.

The buffer 21 holds the supplied input signal and performs buffering on the input signal, and supplies the held input signal to the filter processing unit 22-1, the filter processing unit 22-2 and the mixing unit 23.

The filter processing unit 22-1 and the filter processing unit 22-2 hold filters which are different from each other and perform filter processing operations on the input signals supplied thereto from the buffer 21 using the filters held therein. Then, the filter processing unit 22-1 and the filter processing unit 22-2 supply filtered output signals obtained by performing the filter processing operations on the input signals to the mixing unit 23. Incidentally, in the case that there is no need to discriminate the filter processing unit 22-1 from the filter processing unit 22-2, hereinafter, the filter processing units will be simply referred as the filter processing unit 22.

The mixing unit 23 removes noise from the input signals on the basis of the input signal supplied from the buffer 21 and the filtered output signals supplied from the filter processing unit 22-1 and the filter processing unit 22-2 to output an output signal obtained as a result of noise removal.

Figure 2:
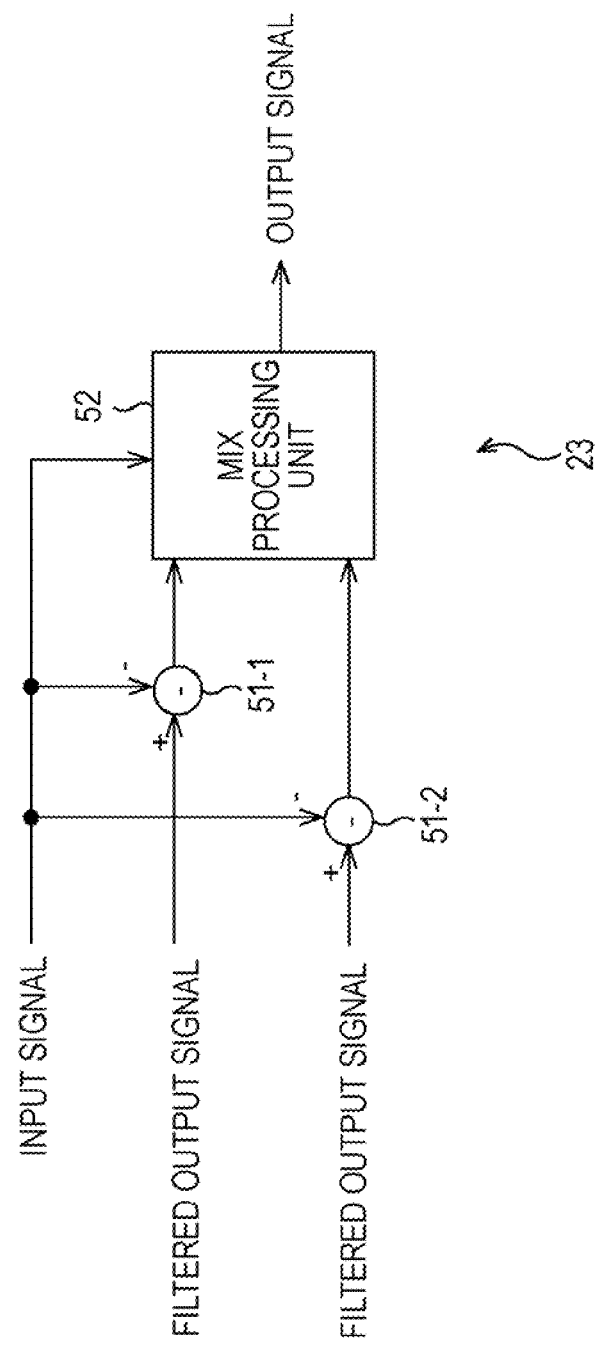
FIG. 2 is a diagram showing a more detailed structural example of a mixing unit.

More specifically, the mixing unit 23 is constructed as shown in FIG. 2. That is, the mixing unit 23 has a subtracting unit 51-1, a subtracting unit 51-2 and a mixing processing unit 52.

In the mixing unit 23, the input signal from the buffer 21 is supplied to the subtracting unit 51-1, the subtracting unit 51-2 and the mixing processing unit 52. The filtered output signal from the filter processing unit 22-1 is supplied to the subtracting unit 51-1 and the filtered output signal from the filter processing unit 22-2 is supplied to the subtracting unit 51-2.

The subtracting unit 51-1 acquires a difference between the input signal from the buffer 21 and the filtered output signal from the filter processing unit 22-1 and supplies a difference signal obtained to the mixing processing unit 52. The subtracting unit 51-2 acquires a difference between the input signal from the buffer 21 and the filtered output signal from the filter processing unit 22-2 and supplies a difference signal obtained to the mixing processing unit 52. Incidentally, in the case that there is no need to discriminate the subtracting unit 51-1 from the subtracting unit 51-2, hereinafter, the subtracting units will be simply referred to as the subtracting unit 51.

The mixing processing unit 52 performs mixing processing on the basis of the difference signal from the subtracting unit 51-1, the difference signal from the subtracting unit 51-2 and the input signal from the buffer 21 to generate an output signal.

Next, noise reduction processing for removing noise from an input signal input into the signal processing device 11 will be described with reference to a flowchart in FIG. 3.

At step S11, the buffer 21 holds input signals supplied thereto and sequentially supplies the input signals held therein to the filter processing units 22 and the mixing unit 23. That is, the buffer 21 sequentially supplies consecutive signal values of the input signal to the filter processing units 22 and the mixing unit 23. The buffer 23 continuously acquires the input signals until supply of input signals to the signal processing device 11 is terminated and holds therein the acquired input signals.

At step S12, the filter processing unit 22-1 and the filter processing unit 22-2 perform filter processing operations on the input signals supplied from the buffer 21 using the filters held therein and supply filtered output signals obtained as a result of execution of the filter processing operations to the subtracting unit 51-1 and the subtracting unit 51-2.

For example, the filter processing unit 22 performs a filter processing operation on a target signal value of the input signal using several signal values of the input signal supplied from the buffer 21. More specifically, in the case that the input signal is an image signal, the filter processing unit 22 performs a filter processing operation by means of the filter held therein on a target pixel of an image formed on the basis of the input signal using the pixel value (signal value) of the target pixel and pixel values (signal values) of several pixels in the vicinity of the target pixel.

At step S13, the subtracting unit 51-1 and the subtracting unit 51-2 respectively calculate differences between the filtered output signal from the filter processing unit 22-1 and the input signal from the buffer 21 and between the filtered output signal from the filter processing unit 22-2 and the input signal from the buffer 21 to obtain difference signals and supply the difference signals obtained to the mixing processing unit 52. That is, the subtracting unit 51 subtracts, from a signal value of the input signal, a signal value of the filtered output signal corresponding to the signal value of the input signal to obtain a difference and supplies a value of the obtained difference to the mixing processing unit 52.

At step S14, the mixing processing unit 52 performs mixing processing to generate an output signal and outputs the generated output signal as a noise-removed input signal. Supposing that Input denotes a signal value of an input signal from the buffer 21, the mixing processing unit 52 calculates the following equation (1) to obtain a signal value Out of an output signal.

[Numerical Formula 1]

$$\text{Out} = \text{Input} + \text{dif}_{total} \quad (1)$$

In the equation (1), $\text{dif}_{total}$ denotes a correction value determined from a difference signal from the subtracting unit 51 by calculating the following equations (2) and (3).

[Numerical Formula 2]

$$\text{dif}_{total} = \begin{cases} \text{dif}_1 + \text{dif}_2 & (\text{dif}_1 \cdot \text{dif}_2 < 0) \\ \text{max\_abs}(\text{dif}_1, \text{dif}_2) & (\text{dif}_1 \cdot \text{dif}_2 \geq 0) \end{cases} \quad (2)$$

[Numerical Formula 3]

$$\text{max\_abs}(\text{dif}_1, \text{dif}_2) = \begin{cases} \text{dif}_1 & (|\text{dif}_1| \geq |\text{dif}_2|) \\ \text{dif}_2 & (|\text{dif}_1| < |\text{dif}_2|) \end{cases} \quad (3)$$

In the equations (2) and (3), $\text{dif}_1$ denotes a signal value of a difference signal from the subtracting unit 51-1 and $\text{dif}_2$ denotes a signal value of a difference signal from the subtracting unit 51-2.

That is, the mixing processing unit 52 obtains the product of the signal value $\text{dif}_1$ of the difference signal and the signal value $\text{dif}_2$ of the difference signal. Then, in the case that the sign of the obtained product of the signal values is negative, that is, the value of the product is less than 0, the sum of the signal value $\text{dif}_1$ and the signal value $\text{dif}_2$ of the difference signals is defined as a correction value $\text{dif}_{total}$.

In the case that the product of the signal value $\text{dif}_1$ of the difference signal and the signal value $\text{dif}_2$ of the difference signal is positive, that is, the value of the product is 0 or more, the mixing processing unit 52 defines any one of the signal value $\text{dif}_1$ and the signal value $\text{dif}_2$ as the correction value $\text{dif}_{total}$ in accordance with the equation (3). That is, in the case that an absolute value of the signal value $\text{dif}_1$ is larger than an absolute value of the signal value $\text{dif}_2$, the signal value $\text{dif}_1$ is defined as the correction value $\text{dif}_{total}$. While, in the case that the absolute value of the signal value $\text{dif}_1$ is smaller than the absolute value of the signal value $\text{dif}_2$, the signal value dif2 is defined as the correction value $\text{dif}_{total}$.

After the correction value $\text{dif}_{total}$ has been obtained, the mixing processing unit 52 obtains the sum of the obtained correction value $\text{dif}_{total}$ and the signal value Input of the input signal and defines the obtained sum as the signal value Out of the output signal.

At step S15, the signal processing device 11 judges whether the processing is to be terminated. For example, when the mixing processing has been performed on all the signal values of the input signal supplied to the buffer 21 and the signal value of the output signal has been obtained, the processing is judged to be terminated.

At step S15, in the case that the processing has been judged not to be terminated, the processing returns to step S12 and the above mentioned series of processing operations is repeated. That is, the next signal value of the input signal held in the buffer 21 is regarded as an object to be processed and a signal value of the output signal is obtained on the basis of the next signal value.

On the other hand, in the case that the processing has been judged to be terminated at step S15, each section of the signal processing device 11 terminates execution of each processing operation which is currently being conducted, by which the noise reduction processing is terminated.

In the above mentioned manner, the signal processing device 11 generates an output signal using differences between each of filtered output signals obtained by performing the filter processing operations using different type filters and an input signal.

Thus, by adding a correction value determined on the basis of each sign and each absolute value of each difference between each of the filtered output signals and the input signal to the input signal in the above mentioned manner, a filter processing operation performed using at least one of the plurality of filters is secured.

That is, in the case that the product of one signal value of one difference signal and the other signal value of the other difference signal is less than 0, the signs of the signal values of the difference signals differ from each other, so that even though the above mentioned signal values are simply added to the input signal, the input signal will not be emphasized too much due to execution of the filter processing operation. Thus, in the case that the product of one signal value of one difference signal and the other signal value of the other difference signal is less than 0, the sum of the signal values of the difference signals is defined as the correction value, by which the effect of the filter processing operation performed using each filter is reflected in the input signal.

On the other hand, in the case that the product of one signal value of one difference signal and the other signal value of the other difference signal is 0 or more, the signal value of at least one difference signal is 0 or the signs of the signal values of the respective difference signals are the same as each other. Thus, simple addition of the signal values of the difference signals to the input signal may induce too much emphasis of the input signal and hence the quality of the input signal, for example, the image quality of an image may be rather deteriorated.

Thus, in the case that the product of one signal value of one difference signal and the other signal value of the other difference signal is 0 or more, a signal value having a maximum absolute value of the signal values of the difference signals is defined as the correction value. That is, a filter processing operation is performed on the input signal using a filter which will work on the input signal most effectively. As a result, noise is surely removed from the input signal by performing the filter processing operation using one filter without deteriorating the quality of the input signal.

As described above, noise is more readily and surely removed from the input signal by correcting the input signal with the correction value determined on the basis of the sign and the absolute value of the signal value of each difference signal.

Incidentally, in general, in the case that a plurality of filters are mounted, in many cases, filter processing is horizontally and vertically divided. If independence of horizontally and vertically divided pieces of filter processing is high, parallel execution of the divided pieces of the filter processing is realized.

Then, for example, as a combination of filters held in the filter processing unit 22-1 and the filter processing unit 22-2, a combination of a filter (hereinafter, referred to as a VBN ((Vertical Block Noise) filter) for removing block noise generated in a vertical direction with a filter (hereinafter, referred to as a HBN ((Horizontal Block Noise) filter) for removing block noise generated in a horizontal direction may be conceived of. More specifically, as the VBN filter and the HBN filter, for example, a smoothing filter using vertically arrayed pixels as objects to be processed and a smoothing filter using horizontally arrayed pixels as objects to be processed may be adopted.

Incidentally, block noise is noise generated in units of DCT (Discrete Cosine Transform) blocks upon execution of image compression processing. Generation of the block noise leads to misalignment between adjacent DCT blocks at the boundary of these blocks.

Figure 4:
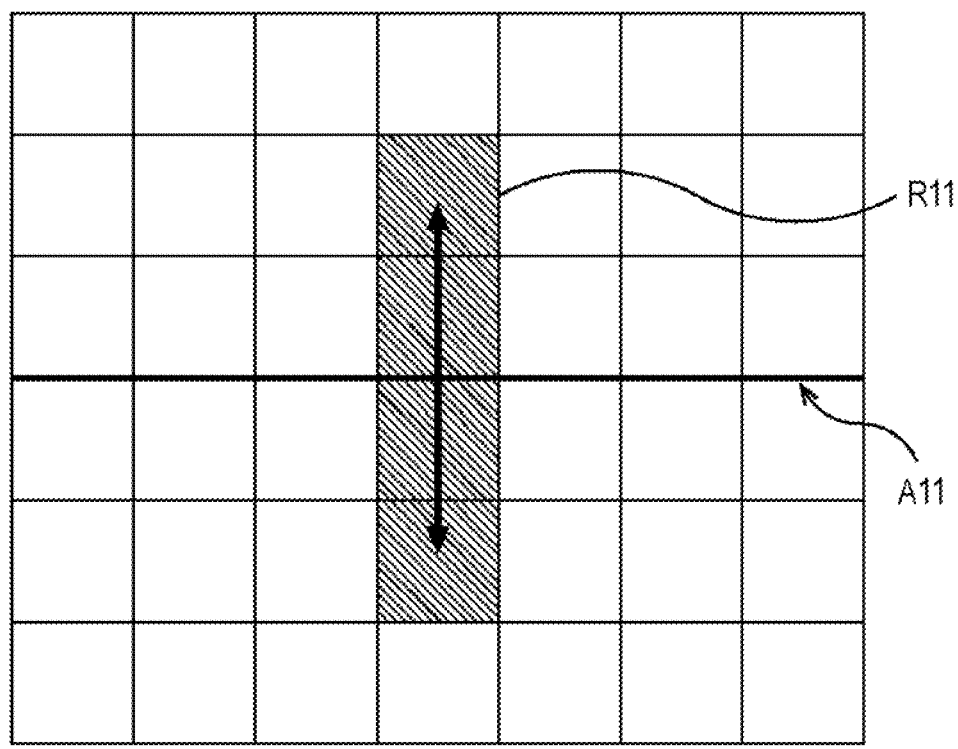
FIG. 4 is a diagram illustrating block noise generated in a vertical direction.

For example, as shown in FIG. 4, it is supposed that block noise has been generated longitudinally or vertically in the drawing within a region R11 of an image formed on the basis of an input signal. Incidentally, in FIG. 4, one square indicates one pixel and a lateral straight line shown by an arrow A11 indicates a boundary between the DCT blocks.

Vertical block noise has been generated in the vicinity of a longitudinal side of each DCT block, in the drawing. In the example shown in FIG. 4, the vertical block noise has been generated in the region R11. A VBN filter oriented in a vertical (longitudinal) direction is suitable for removing the vertical block noise.

Figure 5:
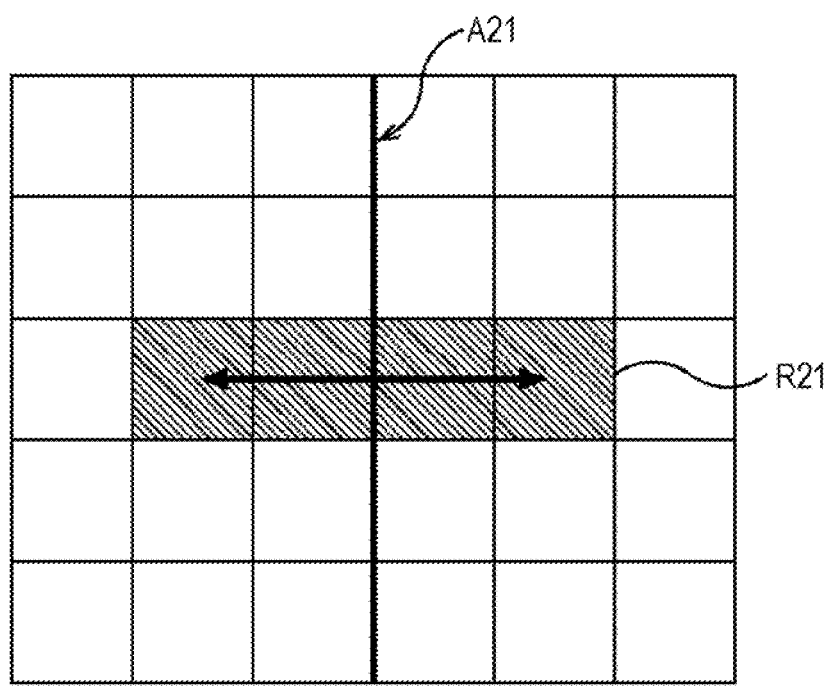
FIG. 5 is a diagram illustrating block noise generated in a horizontal direction.

Likewise, for example, as shown in FIG. 5, it is supposed that block noise has been generated laterally or horizontally, in the drawing, within a region R21 of an image formed on the basis of an input signal. Incidentally, in FIG. 5, one square indicates one pixel and a longitudinal straight line shown by an arrow A21 indicates a boundary between the DCT blocks.

Horizontal block noise has been generated in the vicinity of a lateral side, in the drawing, of each DCT block. In the example shown in FIG. 5, the horizontal block noise has been generated in the region R21. An HBN filter oriented in a horizontal (lateral) direction is suitable for removing the horizontal block noise.

Figure 6:
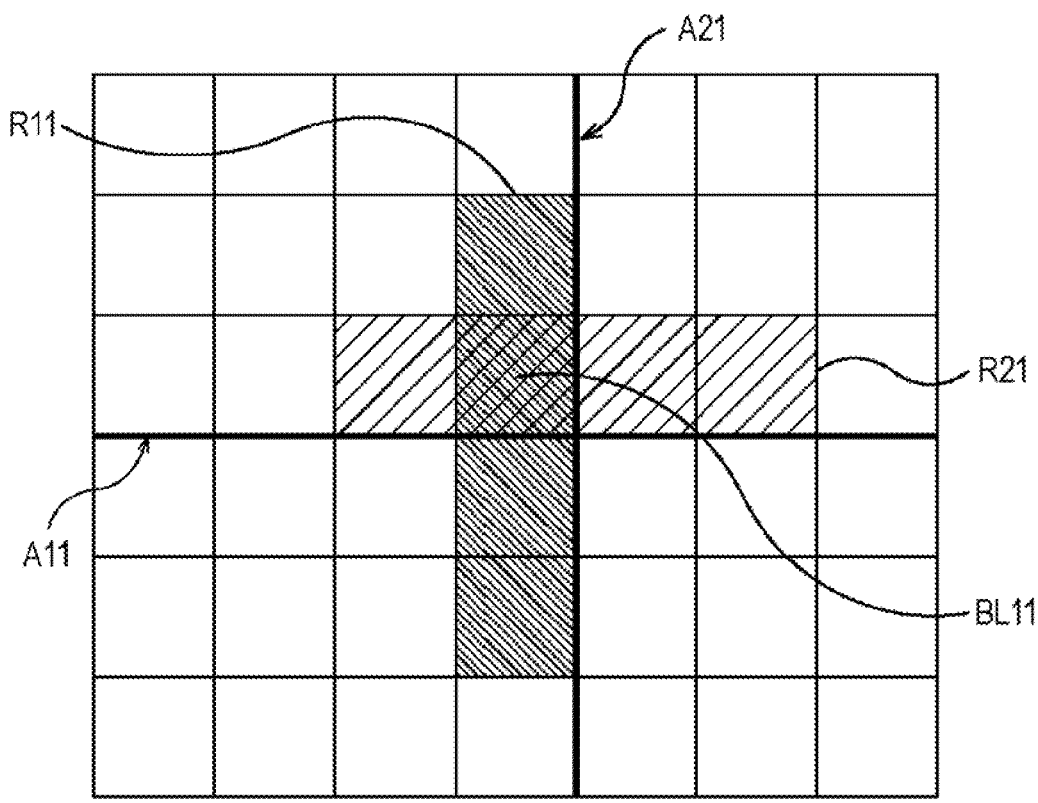
FIG. 6 is a diagram illustrating a manner of removing block noise generated in vertical and horizontal directions.

Therefore, as shown in FIG. 6, in the case that vertical block noise has been generated within a region R11 of an image formed on the basis of an input signal and horizontal block noise has been generated within a region R21 of the same image, the noise is effectively removed from the input signal by using the VBN filter and the HBN filter.

That is, in the above mentioned case, vertical and horizontal block noise will be generated in a region BL11 included both in the region R11 and the region R21. Thus, in order to remove the vertical and horizontal block noise from within the region BL11, filter processing operations using the VBN filter and the HBN filter may be performed on the region BL11.

Thus, for example, the filter processing unit 22-1 performs a filter processing operation on a part corresponding to the region BL11 of the image formed on the basis of the input signal using the VBN filter and the filter processing unit 22-2 performs a filter processing operation on the part using the HBN filter. Then, the mixing unit 23 obtains a correction value determined on the basis of each sign and each absolute value of each signal value of each difference signal, from respective filtered output signals obtained by performing the above mentioned filter processing operations and the input signal to generate an output signal. As a result, at least one of the vertical block noise and the horizontal block noise is surely removed from the region BL11 without deteriorating the quality of the image.

As described above, the filter processing units perform respective filter processing operations in parallel with each other using the VBN filter and the HBN filter to correct the input signal with the correction value determined on the basis of each sign and each absolute value of each signal value of each difference signal, by which memory capacity and processing time are reduced to a greater extent than would be attained by series-coupling respective filter processing operations. As a result, the production cost and calculation cost involved in production of the signal processing device 11 are reduced. It may not be necessary to change a filter used for noise removal for each range of signal values to be processed of an input signal, for example, for each partitioned region of an image and hence more ready and sure noise removal is attained.

In addition, as a combination of filters held in the filter processing unit 22-1 and the filter processing unit 22-2, a combination of a filter for contour correction processing to emphasize a contour part of an object on an image with a filter for image quality (qualitative impression) improvement processing to emphasize a pattern (texture) part on the surface of the object on the image may be conceived of.

Figure 7:
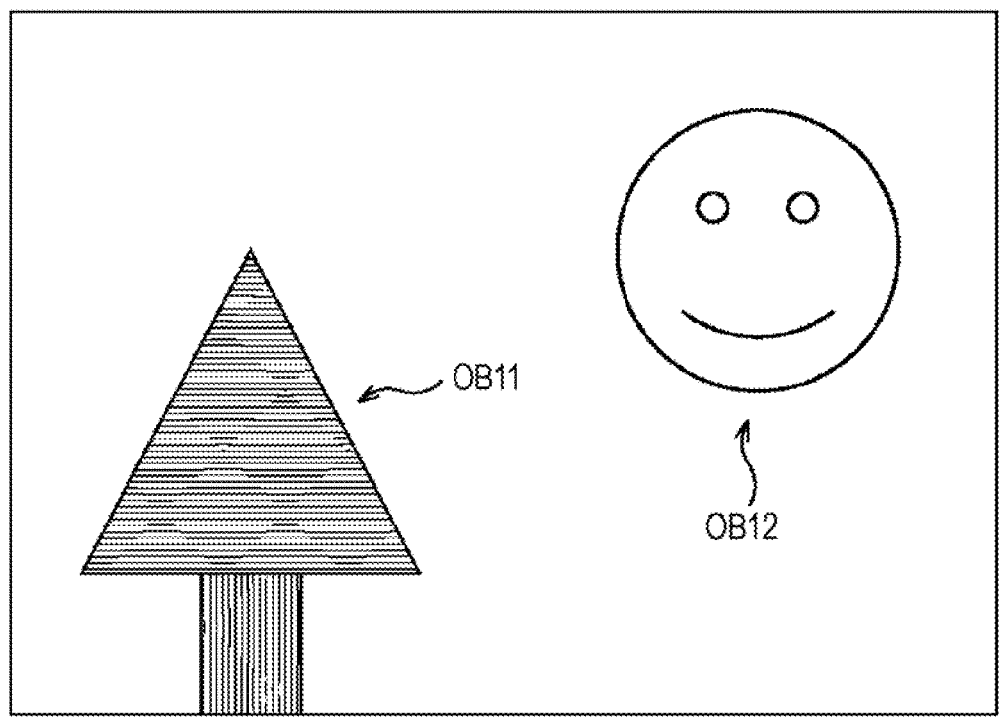
FIG. 7 is a diagram illustrating an example of an image formed on the basis of an input signal.

For example, it is supposed that an image signal of an image on which two objects, that is, an object OB11 and an object OB12 are displayed is input into the signal processing device 11 as an input signal as shown in FIG. 7. It is also supposed that a filter for contour correction processing and a filter for image quality (qualitative impression) improvement processing are respectively held in the respective filter processing units 22.

Figure 8:
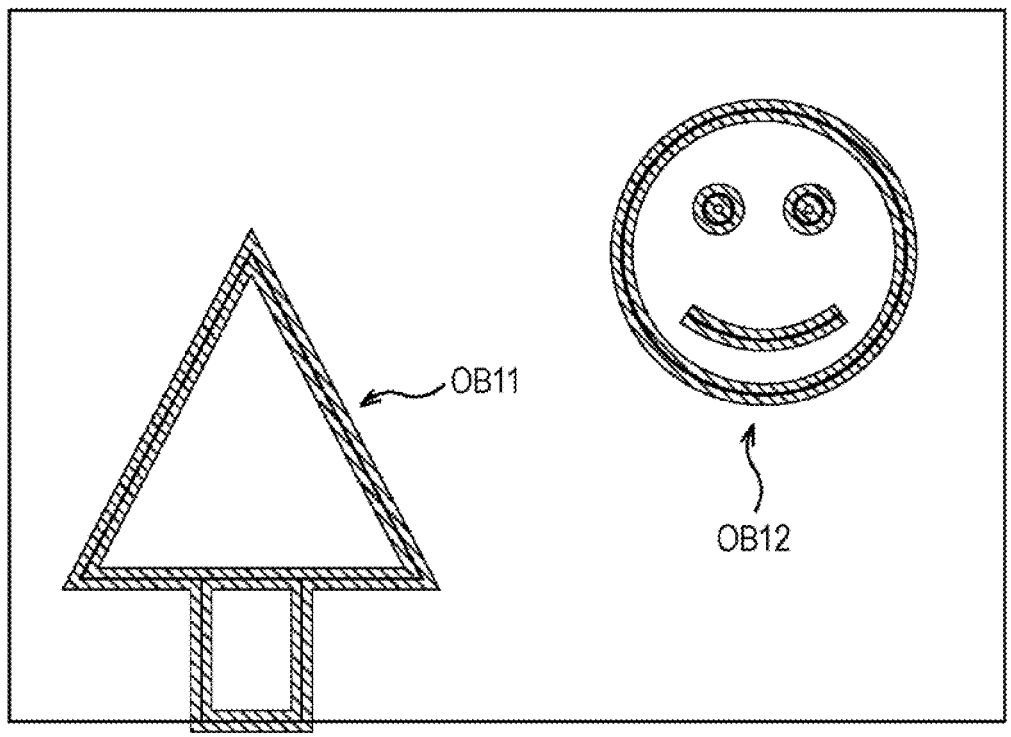
FIG. 8 is a diagram illustrating regions to be subjected to a filter processing operation performed by a filter for contour correction processing.

In the above mentioned case, a filter processing operation is performed on contour parts or shaded parts of the object OB11 and the object OB12 mainly using a filter for contour correction processing as shown in FIG. 8. The filter for contour correction processing is a filter used to generate preover or preshoot in a contour part of an object on an image to emphasize the contour of the object, thereby to emphasize the existence of the object.

Figure 9:
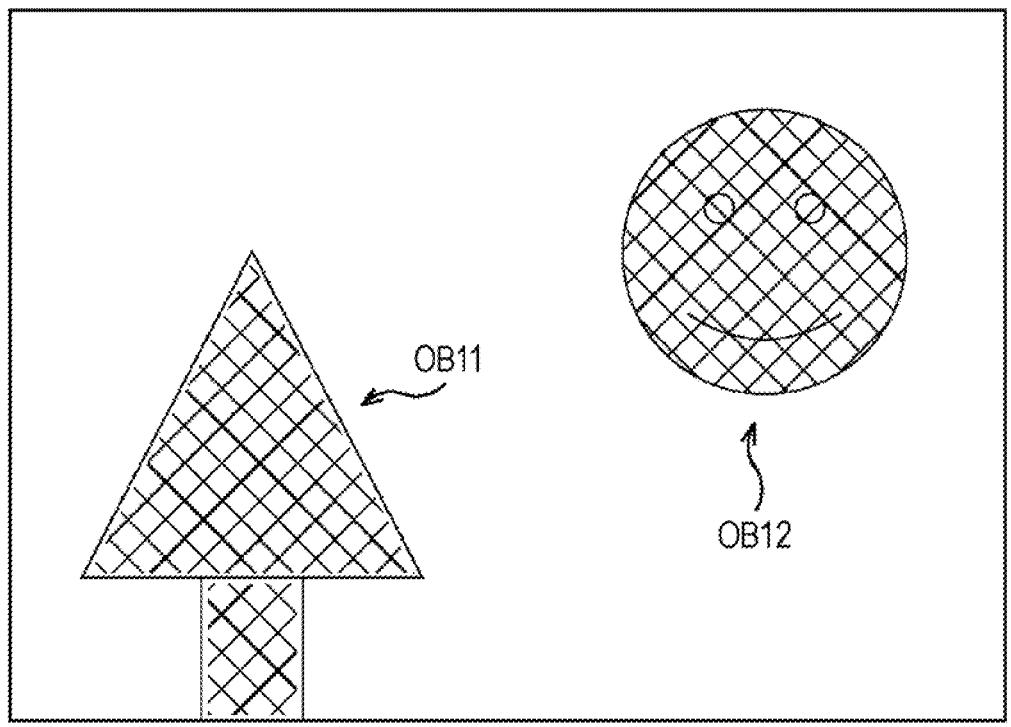
FIG. 9 is a diagram illustrating regions to be subjected to a filter processing operation performed by a filter for image quality (qualitative impression) improvement processing.

A filter processing operation is performed on pattern (texture) parts or meshed parts of the object OB11 and the object OB12 mainly using a filter for image quality (qualitative impression) improvement processing as shown in FIG. 9. The filter for image quality (qualitative impression) improvement processing is a filter used to emphasize a pattern part on the surface of an object, thereby to improve the image quality (qualitative impression) of the object.

The filter for contour correction processing and the filter for image quality (qualitative impression) improvement processing are both high-pass emphasizing type filters, that is, filters for emphasizing a region where a luminance value changes violently. However, these filters differ from each other in terms of characteristics of a target region, that is, in that, for example, which region, a contour part region or a pattern part region, is selected as a target or a region of which band (luminance changing frequency) is selected as a target.

Specifically, high-pass emphasizing type filters used for contour correction processing and image quality (qualitative impression) improvement processing are called un-sharp masking filters. In un-sharp masking, a smoothed signal obtained by smoothing an input signal is subtracted from the input signal to generate a high-pass signal and the high-pass signal multiplied by a given gain is added to a source signal (a pixel value of a pixel to be processed), by which high-pass emphasis is attained.

For example, it is supposed that a pixel to be processed is defined as a pixel X1 and two pixels used for processing in the vicinity of the pixel X1 are defined as a pixel X0 and a pixel X2. It is also supposed that pixel values of the pixels X0 to X2 are x0 to x2. Then, a pixel value Out of the pixel X1 which has been subjected to a filter processing operation by un-sharp masking is obtained by calculating the following equation (4).

[Numerical Formula 4]

$$\text{Out} = x1 + \text{Comp}_{high} \times \text{Gain} \quad (4)$$

In the equation (4), Gain denotes a high-pass emphasis gain of a predetermined constant and $\text{Comp}_{high}$ denotes a value of a high-pass signal obtained by calculating the following equation (5).

[Numerical Formula 5]

$$\text{Comp}_{high} = x1 - \frac{1}{4}(x0 + 2 \cdot x1 + x2) \quad (5)$$

Here, contour correction processing differs from image quality (qualitative impression) improvement processing in terms of a value of Gain obtained by arithmetic operation of un-sharp masking shown in the equation (4). That is, the value of Gain changes depending on characteristic of a region to be emphasized.

As mentioned above, a filter for contour correction processing is combined with a filter for image quality (qualitative impression) improvement processing, a correction value is obtained from each difference between each of filtered output signals obtained by performing filter processing operations using the combined filters and an input signal and the input signal is corrected with the obtained correction value, by which the quality of an image formed on the basis of the input signal is improved.

Further, for example, it is supposed that an input signal input into the signal processing device 11 is an image signal obtained by performing expansion processing (decode processing) on an image signal compressed (encoded) by MPEG (Moving Picture Experts Group) system. In this case, mainly mosquito noise and block noise are thought to be included in the input signal. Incidentally, the mosquito noise is noise with which a false contour generates in a contour part of an object on an image.

Such mosquito noise and block noise as mentioned above are thought to be generated because high-order information or a high-frequency component of an image is lost by quantization in DCT conversion (discrete cosine conversion) conducted upon performing compression processing on an image. Then, as algorithms for reducing such mosquito noise and block noise as mentioned above, for example, the following methods are known.

As for mosquito noise, there has been proposed a method of detecting an edge region of an image and removing the mosquito noise from the detected edge region while maintaining the sharpness of the image using a non-linear smoothing filter, for example, as disclosed in Japanese Laid-Open Patent Publication No. 2004-336651.

As for block noise, there has been proposed a method of calculating a parameter necessary for judgment of block distortion from input image data and judging whether block distortion is present on the basis of a result of calculation of the parameter and a result of detection of a parameter indicative of the degree of difficulty of encoding an image, for example, as disclosed in International Publication Pamphlet No. WO 98/54892. In this method, a correction value used to reduce the block distortion is calculated in accordance with a result of judgment as to presence of block distortion and the input image data is corrected with the calculated correction value.

As methods of removing mosquito noise and block noise, there have been proposed many methods other than the above methods.

Block noise and mosquito noise are generated in different regions on an image. Specifically, in many cases, block noise is generated in a region around a boundary between adjacent DCT blocks on an image, for example, as shown in FIG. 10.

Figure 10:
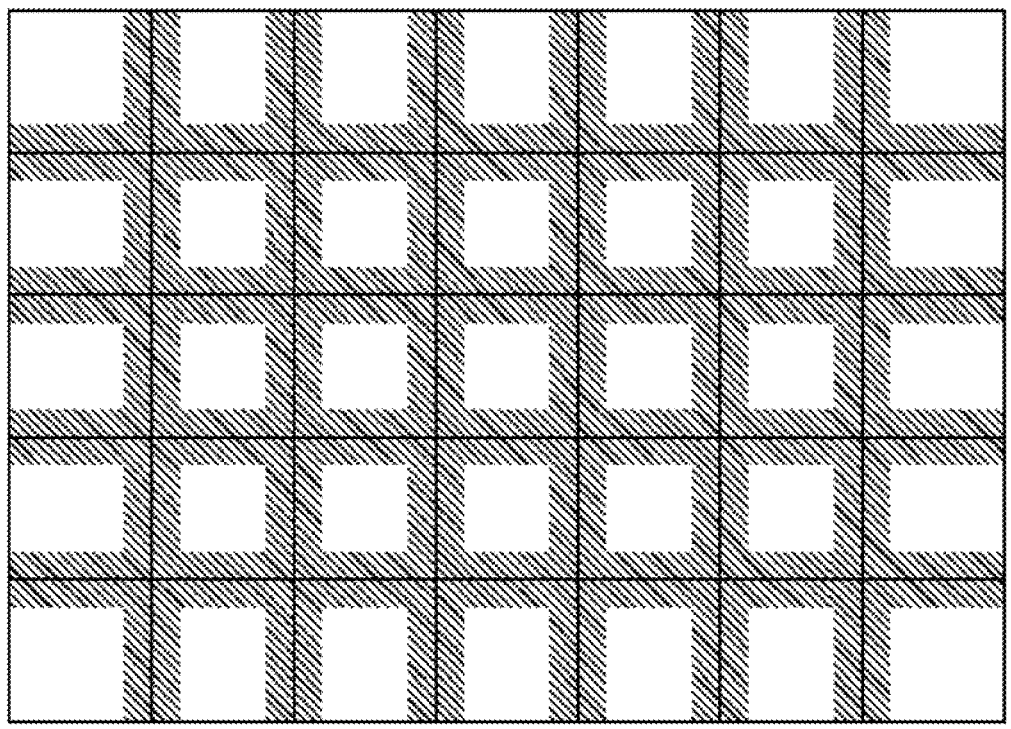
FIG. 10 is a diagram illustrating regions where block noise is generated.

In FIG. 10, one square indicates one DCT block on an image and a shaded region is a region where block noise has been generated. That is, the block noise is generated in a part around a boundary between adjacent DCT blocks.

Figure 11:
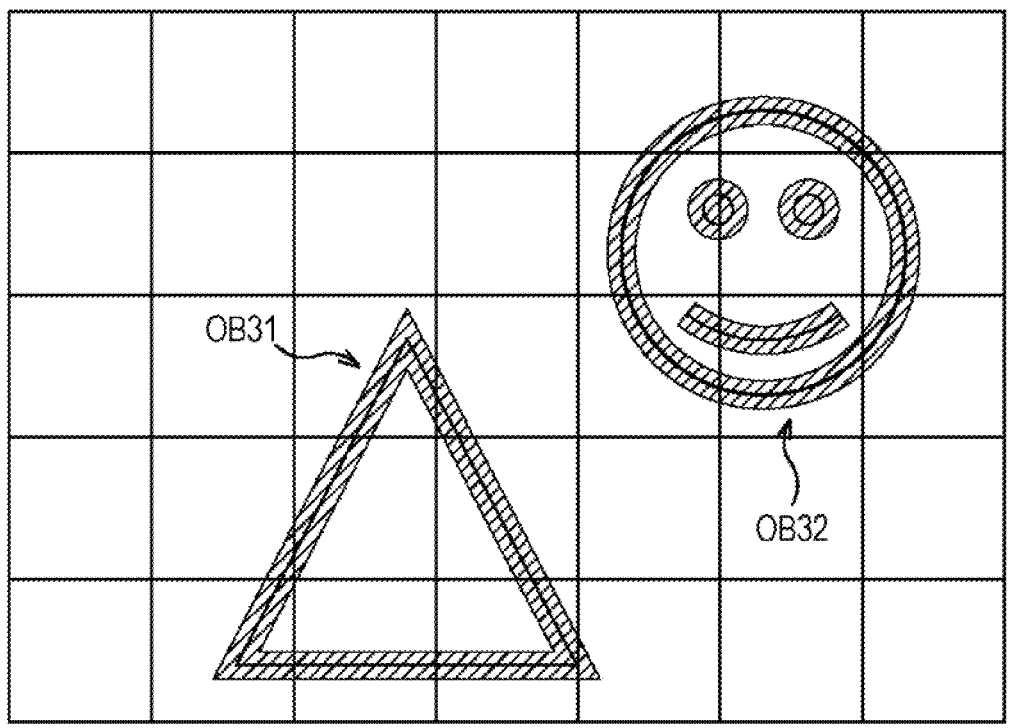
FIG. 11 is a diagram illustrating regions where mosquito noise is generated.

On the other hand, in many cases, mosquito noise is generated in a region around the contour of an object on an image, for example, as shown in FIG. 11. In FIG. 11, a shaded region indicates a region where the mosquito noise has been generated.

In FIG. 11, two objects, an object OB31 and an object OB32, are present on an image. Mosquito noise has been generated in edged regions such as contour parts of the object OB31 and the object OB32.

Therefore, in many cases, a filter for removing block noise and a filter for removing mosquito noise are designed to exhibit effect concentrating on a region of a part around a boundary between adjacent DCT blocks and an edged region.

In addition, in the feature of each noise, in order to remove block noise, it may be necessary to correct discontinuity of small amplitude of the noise using pixels within a somewhat wider region. Therefore, as a filter for removing the block noise, in many cases, a long tap type low-pass filter, for example, such as a smoothing filter is used. Here, the small amplitude means that a difference between luminance values of mutually adjacent pixels on an image is relatively small.

On the other hand, in the case that mosquito noise is to be removed, processing is performed mainly on pixels around an edge and hence, in many cases, a filter having an edge saving property such as a $\epsilon$ filter is used as a filter for removing the mosquito noise. A filter having an edge saving property is a filter by which an edge on an image, that is, a step difference in luminance will not be lost even if a filter processing operation is performed on the edge.

Thus, in the signal processing device 11, in the case that block noise and mosquito noise are to be removed from an input signal, as filters to be used in the filter processing units 22, for example, a smoothing filter and a $\epsilon$ filter are adopted.

Figure 12:
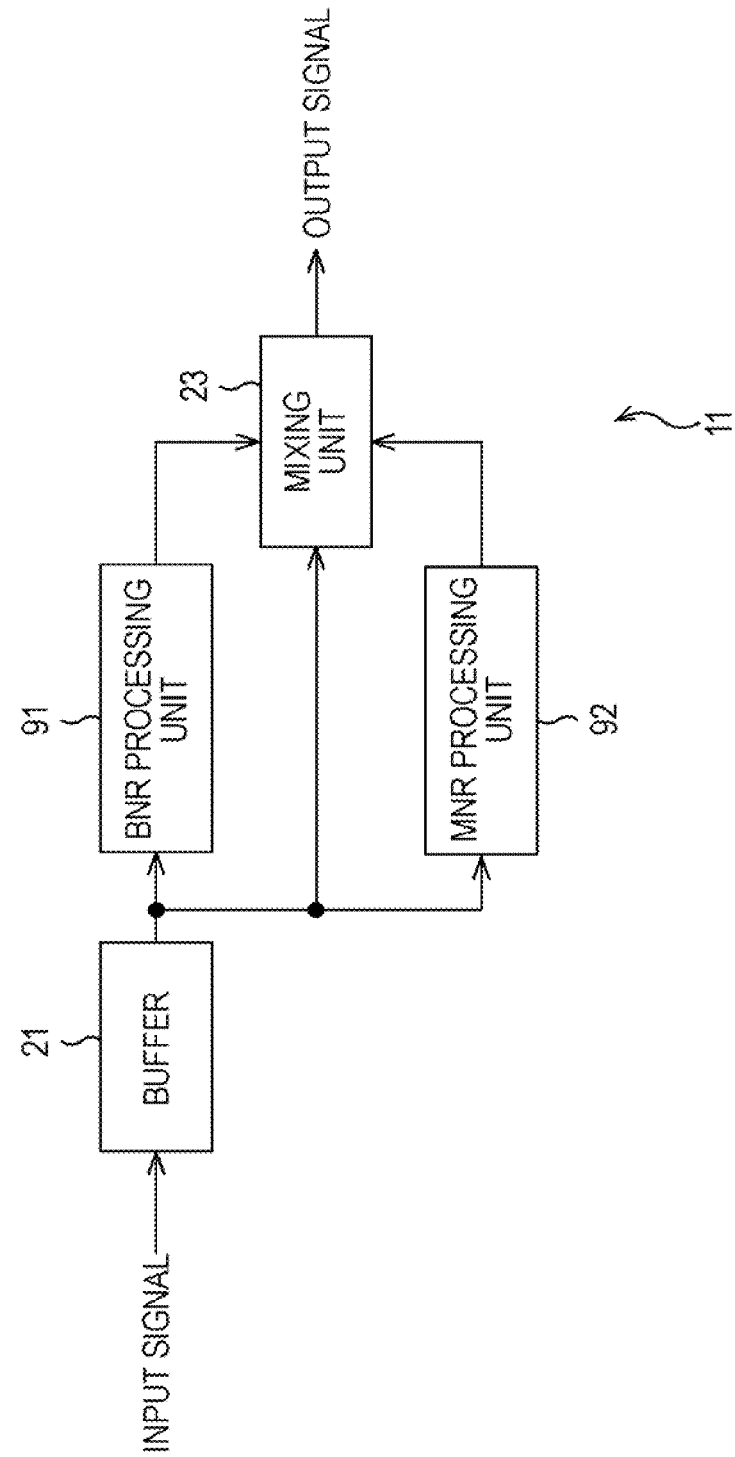
FIG. 12 is a diagram showing another structural example of the signal processing apparatus according to an embodiment of the present invention.

In the case as mentioned above, the signal processing device 11 is constructed, for example, as shown in FIG. 12. That is, the signal processing device 11 shown in FIG. 12 is constituted by the buffer 21, the mixing unit 23, a BNR (Block Noise Reduction) processing unit 91 and an MNR (Mosquito Noise Reduction) processing unit 92. Incidentally, in FIG. 12, the same numerals are assigned to parts corresponding to those in FIG. 1 and the description thereof will be appropriately omitted.

The BNR processing unit 91 corresponds to the filter processing unit 22-1 and holds therein, for example, a smoothing filter. That is, the BNR processing unit 91 performs a filter processing operation on an input signal from the buffer 21 using the smoothing filter held therein and supplies a filtered output signal obtained as a result of execution of the filter processing operation to the subtracting unit 51-1 of the mixing unit 23.

The MNR processing unit 92 corresponds to the filter processing unit 22-2 and holds therein, for example, a ϵ filter. That is, the MNR processing unit 92 performs a filter processing operation on an input signal from the buffer 21 using the ϵ filter held therein and supplies a filtered output signal obtained as a result of execution of the filter processing operation to the subtracting unit 51-2 of the mixing unit 23.

That is, in the signal processing device 11 shown in FIG. 12, the filter processing unit 22-1 in FIG. 1 with a smoothing filter held therein acts as the BNR processing unit 91 and the filter processing unit 22-2 in FIG. 1 with a ϵ filter held therein acts as the MNR processing unit 92.

Figure 3:
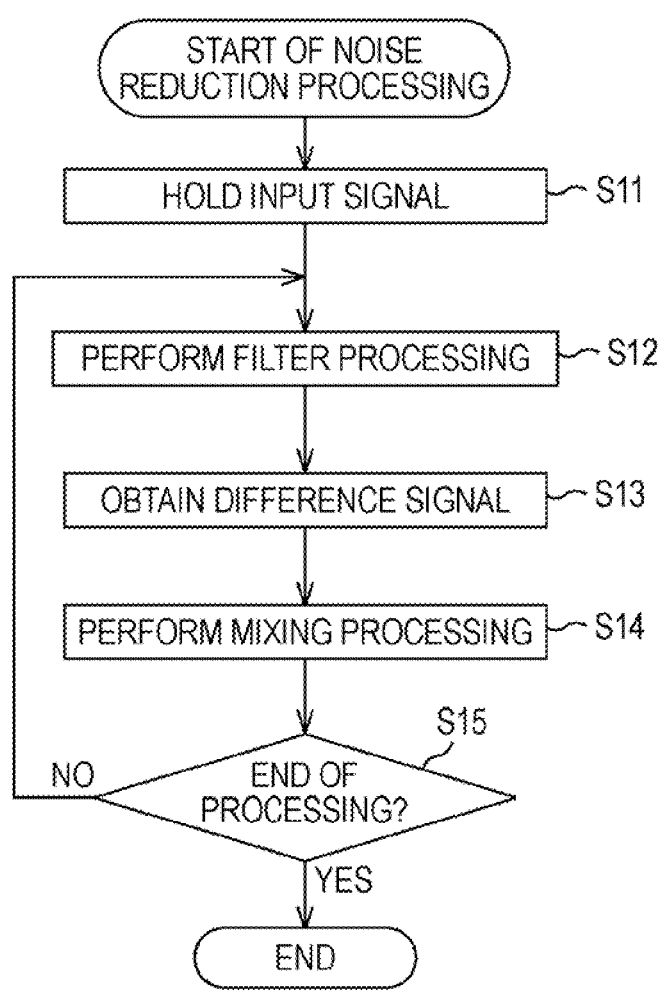
FIG. 3 is a flowchart illustrating noise reduction processing.

As in the case with the signal processing device 11 shown in FIG. 1, in the signal processing device 11 shown in FIG. 12, when an input signal is supplied to the device, processing which is the same as the noise reduction processing described with reference to the flowchart in FIG. 3 is performed to generate an output signal obtained by removing the block noise and the mosquito noise from the input signal.

In this case, at step S12, the BNR processing unit 91 performs a filter processing operation on the input signal from the buffer 21 using the smoothing filter and supplies the filtered output signal obtained as a result of execution of the filter processing operation to the subtracting unit 51-1 of the mixing unit 23. Likewise, the MNR processing unit 92 performs a filter processing operation on the input signal from the buffer 21 using the ϵ filter and supplies the filtered output signal obtained as a result of execution of the filter processing operation to the subtracting unit 51-2 of the mixing unit 23.

Then, in the mixing unit 23, an output signal is generated from the input signal from the buffer 21, the filtered output signal from the BNR processing unit 91 and the filtered output signal from the MNR processing unit 92. That is, a difference between the filtered output signal from the BNR processing unit 91 and the input signal is obtained and the difference obtained is defined as a difference signal and a difference between the filtered output signal from the MNR processing unit 92 and the input signal is obtained and the difference obtained is defined as a difference signal. Then, the mixing processing unit 52 calculates the equations (1) to (3) from the obtained difference signals and the input signal to obtain a signal value of the output signal.

For example, it is supposed that bnr-in denotes a signal value of a filtered output signal from the BNR processing unit 91 and mnr-in denotes a signal value of a filtered output signal from the MNR processing unit 92. It is also supposed that $dif_1$ denotes a difference between the signal value bnr-in of the filtered output signal and the signal value Input of the input signal, that is, a signal value of the difference signal and $dif_2$ denotes a difference between the signal value mnr-in of the filtered output signal and the signal value Input of the input signal, that is, a signal value of the difference signal.

Figure 13:
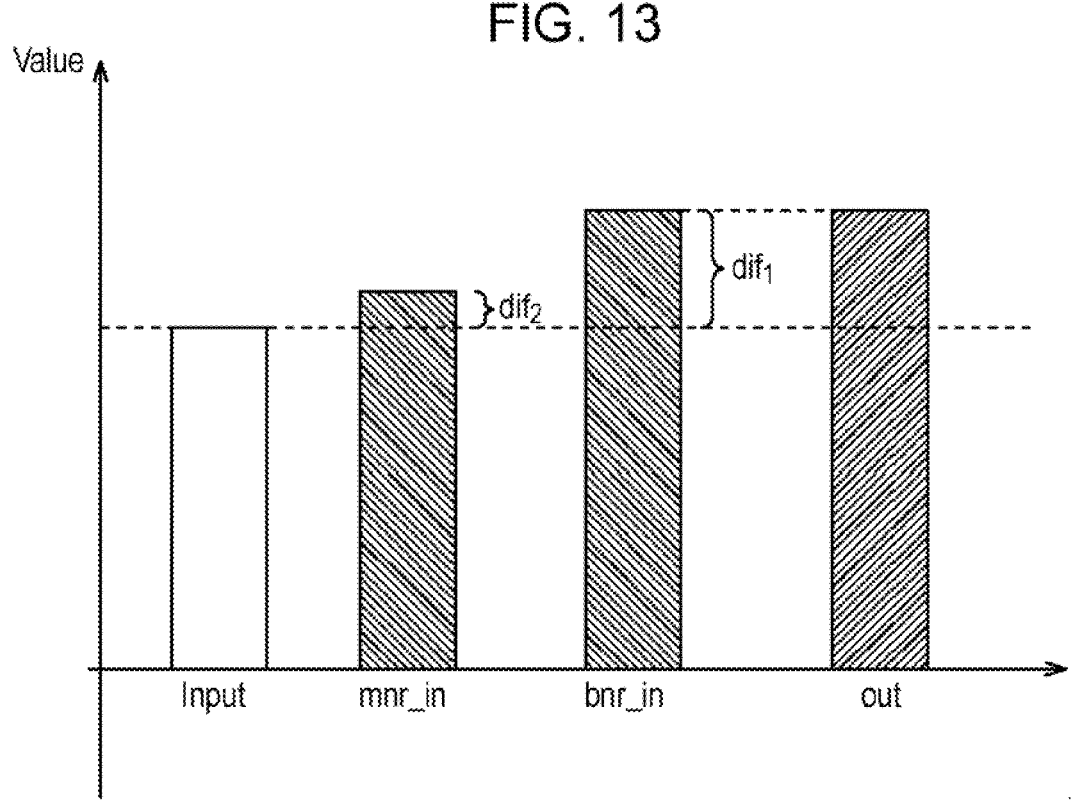
FIG. 13 is a diagram illustrating generation of one output signal.

In the above mentioned situation, in the case that the product of the signal value $dif_1$ and the signal value $dif_2$ is 0 or more and an absolute value of the signal value $dif_1$ is larger than or equal to an absolute value of the signal value $dif_2$, the sum of the signal value Input and the signal value $dif_1$ is defined as the output value Out of the output signal, for example, as shown in FIG. 13.

Incidentally, in FIG. 13, the signal value Input of the input signal, the signal value mnr-in of the filtered output signal from the MNR processing unit 92, the signal value bnr-in of the filtered output signal from the BNR processing unit 91 and the signal value Out of the output signal are shown in this order laterally from the left to the right. The vertical axis indicates the magnitudes of the above mentioned signal values.

In the example shown in FIG. 13, the signal value mnr-in and the signal value bnr-in of the filtered output signals are larger than the signal value Input of the input signal, so that the product of the difference between the input signal and one filtered output signal and the difference between the input signal and the other filtered output signal will be 0 or more. As for the signal values of the filtered output signals, the signal value bnr-in is larger than the signal value mnr-in, so that the signal value $dif_1$ of the difference signal obtained from the filtered output signal from the BNR processing unit 91 is defined as the correction value $dif_{total}$. Then, a value obtained by adding the correction value $dif_{total}$ to the signal value Input of the input signal is defined as the signal value Out of the output signal.

Figure 14:
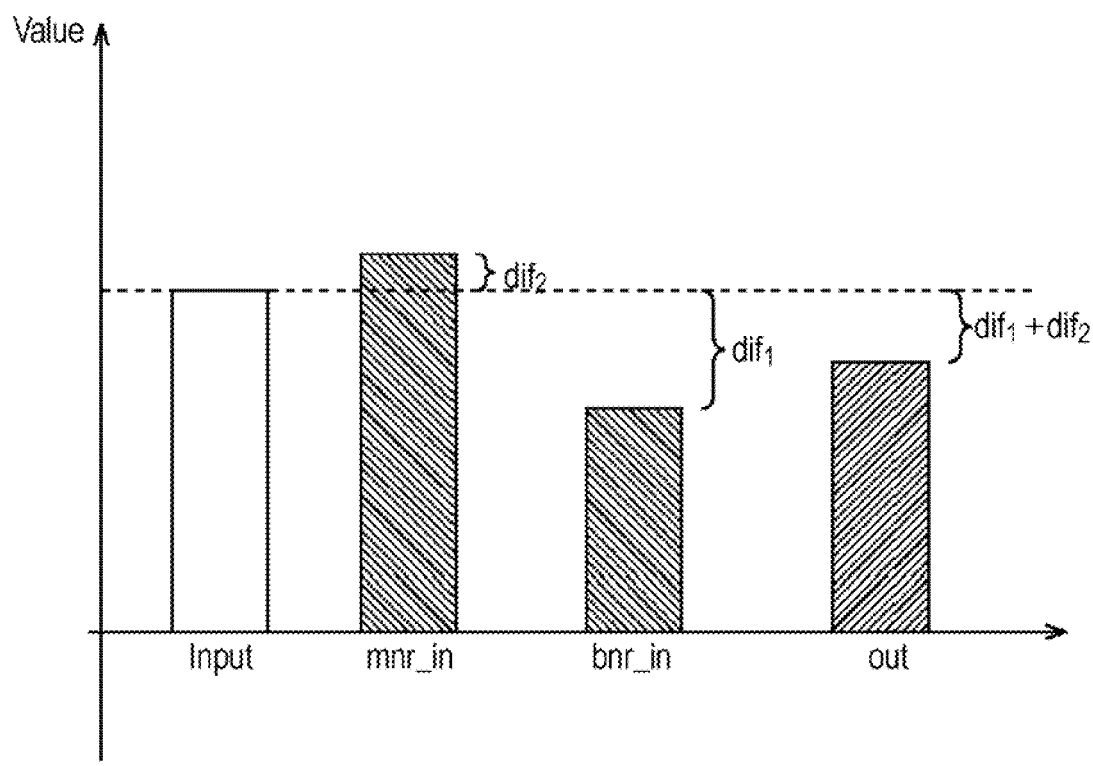
FIG. 14 is a diagram illustrating generation of another output signal.

On the other hand, in the case that the product of the signal value $dif_1$ and the signal value $dif_2$ is less than 0, the sum of the signal value Input, the signal value $dif_1$ and the signal value $dif_2$ is defined as the signal value Out of the output signal, for example, as shown in FIG. 14.

Incidentally, in FIG. 14, the signal value Input of the input signal, the signal value mnr-in of the filtered output signal from the MNR processing unit 92, the signal value bnr-in of the filtered output signal from the BNR processing unit 91 and the signal value Out of the output signal are shown in this order laterally from the left to the right. The vertical axis indicates the magnitudes of the above mentioned signal values.

In the example shown in FIG. 14, the signal value mnr-in of the filtered output signal is larger than the signal value Input of the input signal and the signal value bnr-in of the filtered output signal is smaller than the signal value Input of the input signal, so that the product of the difference between the input signal and one filtered output signal and the difference between the input signal and the other filtered output signal will be less than 0. Therefore, the sum of the signal value $dif_1$ of the difference signal obtained from the filtered output signal from the BNR processing unit 91 and the signal value $dif_2$ of the difference signal obtained from the filtered output signal from the MNR processing unit 92 is defined as the correction value $dif_{total}$. Then, a value obtained by adding the correction value $dif_{total}$ to the signal value Input of the input signal is defined as the signal value Out of the output signal. In the example shown in FIG. 14, the signal value Out of the output signal is smaller than the signal value Input of the input signal.

By using the smoothing filter and the ϵ filter in combination in the signal processing device 11 as mentioned above, block noise and mosquito noise are readily and surely removed from an input signal.

In general, in the case that block noise and mosquito noise are to be removed from an input signal simultaneously, a filter used to remove the block noise differs from a filter used to remove the mosquito noise in terms of a region on an image to which each filter will work effectively, but this fact may not mean that these filters will work totally exclusively. Thus, in a system in which any one of filters (filter processing operations) is alternatively selected in accordance with a region to be processed on an image, the noise removing effect may be reduced. In addition, since different type filters are used, substitution of one filter for the other filter is difficult.

On the other hand, in the signal processing device 11, the effect of each filter processing operation is exhibited by correcting an input signal with a correction value determined in accordance with each sign and each absolute value of each signal value of each difference signal, without inducing a breakdown due to execution of mixing processing. That is, at least one filter processing operation is secured and hence noise is more surely removed from the input signal with no generation of any unnatural artifact on an image.

In addition, in the signal processing device 11, it may not be necessary to install a mechanism for detecting a region to be processed for each filter and use of a plurality of filters may not induce too much emphasis of the effect brought about by the filters used. Further, since changeover of a filter used may not be necessary, time-directional and space-directional stability of filter processing may not be reduced. That is, it may not occur that a filter processing operation which is different for different time is performed on a region of the same part of an image and an unnatural boundary between adjacent regions appears on an image due to changeover of a filter used.

Further, in the signal processing device 11, the calculation cost and the production cost are reduced as compared with a situation where respective filter processing operations are series-coupled and such an unintended operation may not be performed that a region on an image which is to be subjected to another filter processing operation is not detected due to the influence of execution of a predetermined filter processing operation and an appropriate filter processing operation is not performed.

An example in which an output signal is generated using filtered output signals obtained by two filter processing units 22 (the BNR processing unit 91 and the MNR processing unit 92) and an input signal has been described, however the number of filter processing units 22 is not limited to two, but three or more filter processing units may be incorporated into the image processing device.

In the situation as mentioned above, in each of a plurality of filter processing units 22 incorporated into the signal processing device 11, a filter processing operation is performed on an input signal and each difference between each filtered output signal obtained in each filter processing unit 22 and the input signal is obtained to generate each difference signal. Then, among signal values of difference signals generated, a maximum signal value is defined as a signal value $dif_1'$ corresponding to the signal value $dif_1$ in the equation (2) and a minimum signal value is defined as a signal value $dif_2'$ corresponding to the signal value $dif_2$ in the equation (2).

That is, the mixing processing unit 52 calculates the following equations (6) to (8) to obtain a correction value $dif_{total}$ and calculates the sum of the obtained correction value $dif_{total}$ and the signal value Input of the input signal in accordance with the equation (1) to obtain a signal value Out of an output signal.

[Numerical Formula 6]

$$dif_1' = \max(dif_i : i = 1, \ldots n) \quad (6)$$

[Numerical Formula 7]

$$dif_2' = \min(dif_i : i = 1, \ldots n) \quad (7)$$

[Numerical Formula 8]

$$dif_{total} = \begin{cases} dif_1' + dif_2' & (dif_1' \cdot dif_2' < 0) \\ \max\_abs(dif_1', dif_2') & (dif_1' \cdot dif_2' \geq 0) \end{cases} \quad (8)$$

In the equation (6), among signal values $dif_1$ to $dif_n$ of difference signals obtained from respective filtered output signals from n filter processing units 22, a maximum signal value $dif_i$ ($1 \leq i \leq n$) is defined as the signal value $dif_1'$.

In the equation (7), among signal values $dif_1$ to $dif_n$ of difference signals obtained from respective filtered output signals from n filter processing units 22, a minimum signal value $dif_i$ ($1 \leq i \leq n$) is defined as the signal value $dif_2'$.

Then, in the equation (8), the product of the signal value $dif_1'$ and the signal value $dif_2'$ is obtained. In the case that the sign of the obtained product of the signal value $dif_1'$ by the signal value $dif_2'$ is negative, that is, the value of the product is less than 0, the sum of the signal value $dif_1'$ and the signal value $dif_2'$ is defined as the correction value $dif_{total}$.

In the case that the sign of the product of the signal value $dif_1'$ by the signal value $dif_2'$ is positive, that is, the value of the product is 0 or more, of the signal value $dif_1'$ and the signal value $dif_2'$, one signal value of an absolute value larger than that of the other signal value is defined as the correction value $dif_{total}$.

As mentioned above, in the case that three or more filter processing units 22 are incorporated into the signal processing device 11 and three or more filters are used, among signal values of difference signals, a maximum signal value and a minimum signal value are used to obtain a correction value. Thus, among a plurality of filters, only a filter which is superior to the other filters in noise removing effect exhibited on the input signal is used for execution of a filter processing operation. As a result, it may not occur that due to too much emphasis of the input signal, effects of respective filters are canceled out, and noise is more readily and surely removed from the input signal. That is, one or two filter processing operation(s) performed by one or two filter(s) among the plurality of filters is(are) secured.

A method of obtaining a correction value using difference signals obtained from some filters which will work more effectively on an input signal than other filters in a plurality of filters in the above mentioned manner is applied not only to the case where block noise reduction processing and mosquito noise reduction processing are performed on an image signal obtained by further expanding an image compressed, for example, by MPEG system, but also to the case where noise other than the block noise and the mosquito noise is to be removed. That is, the method is applied to, for example, the case where noise removal is to be conducted in a plurality of space directions on an image or the case where space-directional noise removal and time-directional noise removal are to be simultaneously conducted on an image.

In addition, the signal processing device 11 may be applied not only to general image processing to be performed on an image signal such as contour emphasis and improvement of sharpness, but also to general filter processing to be performed on an electric signal such as removal of noise from a sound signal.

Although, the example in which each difference between an input signal and each filtered output signal is obtained in the mixing unit 23 has been described, the difference between the input signal and each filtered output signal may be obtained in each of the filter processing units 22 (the BNR processing unit 91 and the MNR processing unit 92). In the latter case, the subtracting unit 51 may be eliminated from the mixing unit 23.

The above mentioned series of processing operations may be executed by means of either hardware or software. In the case that the series of processing operations is to be executed by means of software, a program constituting the software is installed into a computer which is incorporated into special purpose hardware or into, for example, a general purpose computer realizing execution of various functions by installing thereinto various programs through a program storage medium.

Figure 15:
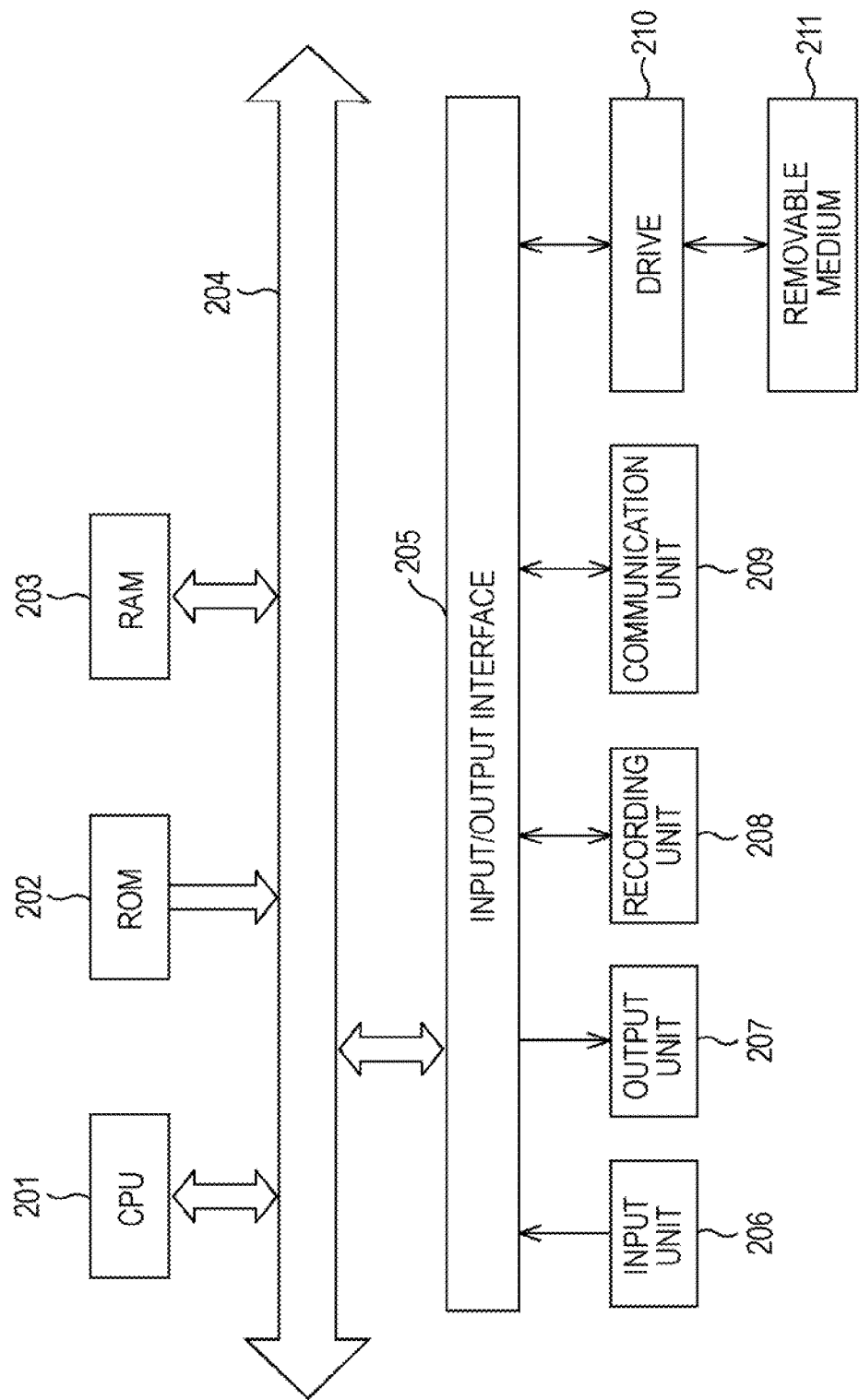
FIG. 15 is a diagram showing a structural example of a computer.

FIG. 15 is a block diagram showing a structural example of hardware of a computer for executing the above mentioned series of processing operations in accordance with a program.

In the computer, a CPU (Central Processing Unit) 201, a ROM (Read Only Memory) 202 and a RAM (Random Access Memory) 203 are connected to one another via a bus 204.

An input/output interface 205 is also connected to the bus 204. An input unit 206 constituted by a keyboard, a mouse and a microphone, an output unit 207 constituted by a display and a loudspeaker, a recording unit 208 constituted by a hard disc and a nonvolatile memory, a communication unit 209 constituted by a network interface and a drive 210 for driving a removable medium 211 such as a magnetic disc, an optical disc, a magneto-optical disc or a semiconductor memory are connected to the input/output interface 205.

In the computer constructed as mentioned above, the CPU. 201 loads a program recorded, for example, on the recording unit 208 into the RAM 203 via the input/output interface 205 and the bus 204 and executes the program, by which the above mentioned series of processing operations is performed.

A program to be executed by the computer (the CPU 201) is provided by being recorded on the removable medium 211 which is a package medium constituted by, for example, a magnetic disc (including a flexible disc), an optical disc (CD-ROM (Compact Disc-Read Only Memory), a DVD (Digital Versatile Disc) and others), a magneto-optical disc or a semiconductor memory or is provided via a wire or wireless transmission medium such as a local area network, Internet or digital satellite broadcasting.

A program may be installed into the recording unit 208 via the input/output interface 205 by mounting the removable medium 210 onto the drive 210. In addition, a program may be received by the communication unit 209 via a wire or wireless transmission medium and then may be installed into the recording unit 208. Further, a program may be installed in advance into the ROM 202 or the recording unit 208.

Incidentally, a program to be executed by a computer may be a program in accordance with which processing operations are performed in time series in the order described in the present specification or a program in accordance with which several processing operations are performed in parallel with one another or a processing operation is performed at an appropriate timing such as a timing at which a call has been given.

The present application contains subject matter related to that disclosed in Japanese Priority Patent Application JP 2008-094846 filed in the Japan Patent Office on Apr. 1, 2008, the entire content of which is hereby incorporated by using their reference.

It should be understood by those skilled in the art that embodiments of the present invention are not limited to the above mentioned embodiments, but the present invention may be modified and altered in a variety of ways within a range without departing from the scope and the gist of the present invention.

What is claimed is:

1. A signal processing device for performing filter processing operations on an input signal to generate an output signal, comprising:
    a plurality of filter processing means for performing a plurality of filter processing operation on said input signal and generating a plurality of filtered signals;
    one or more subtracting units for generating a difference signal for each of the plurality of filtered signals, wherein each difference signal is the difference between each of the plurality of filtered signals and the input signal respectively; and
    generating means for generating said output signal by adding a correction value to the input signal, wherein generating said correction value comprises:
        determining a maximum value of the difference signals for the plurality of filtered signals and a minimum value of the difference signals for the plurality of filtered signals;
        determining whether a product of the maximum value and the minimum value is greater than zero, zero, or less than zero; and
        setting the correction value to one of either the maximum value or the minimum value having the largest absolute value if the product is greater than zero or zero, and setting the correction value to the sum of the maximum value and the minimum value if the product is less than zero.

2. The device according to claim 1, wherein the plurality of filter processing means comprises:
    a first filter processing means for performing said filter processing operation using a filter for performing smoothing processing, and
    a second filter processing means for performing said filter processing operation using a filter having an edge saving property.

3. A signal processing method for performing filter processing operations on an input signal to generate an output signal, comprising the steps of:
    performing a filter processing operation on said input signal by means of a plurality of filter processing means to generate a plurality of filtered signals;
    generating a difference signal for each of the plurality of filtered signals, wherein each difference signal is the difference between each of the plurality of filtered signals and the input signal respectively; and
    generating said output signal by adding a correction value to the input signal, wherein generating said correction value comprises:
        determining a maximum value of the difference signals for the plurality of filtered signals and a minimum value of the difference signals for the plurality of filtered signals;
        determining whether a product of the maximum value and the minimum value is greater than zero, zero, or less than zero; and
        setting the correction value to one of either the maximum value or the minimum value having the largest absolute value if the product is greater than zero or zero, and setting the correction value to the sum of the maximum value and the minimum value if the product is less than zero.

4. A computer-readable medium storing a signal processing program for performing filter processing operations on an input signal using a plurality of filters to generate an output signal, comprising the steps of:

performing a filter processing operation on said input signal by means of filter processing means to generate a plurality of filtered signals;

generating a difference signal for each of the plurality of filtered signals, wherein each difference signal is the difference between each of the plurality of filtered signals and the input signals respectively; and generating said output signal by adding a correction value to the input signal, wherein generating said correction value comprises:

determining a maximum value of the difference signals for the plurality of filtered signals and a minimum value of the difference signals for the plurality of filtered signals;

determining whether a product of the maximum value and the minimum value is greater than zero, zero, or less than zero; and setting the correction value to one of either the maximum value or the minimum value having the largest absolute value if the product is greater than zero or zero, and setting the correction value to the sum of the maximum value and the minimum value if the product is less than zero.

5. A signal processing device performing filter processing operations on an input signal to generate an output signal, comprising:

a filter processing unit configured to perform a plurality of filter processing operations on said input signal and generating a plurality of filtered signals;

one or more subtracting units for generating a difference signal for each of the plurality of filtered signals, wherein each difference signal is the difference between each of the plurality of filtered signals and the input signal respectively; and a generating unit configured to generate said output signal by adding a correction value to the input signal, wherein generating said correction value comprises:

determining a maximum value of the difference signals for the plurality of filtered signals and a minimum value of the difference signals for the plurality of filtered signals;

determining whether a product of the maximum value and the minimum value is greater than zero, zero, or less than zero; and setting the correction value to one of either the maximum value or the minimum value having the largest absolute value if the product is greater than zero or zero, and setting the correction value to the sum of the maximum value and the minimum value if the product is less than zero.

6. The device according to claim 1, wherein the plurality of filter processing means comprises:

a first filter processing means for performing said filter processing operation using a vertical block filter for removing block noise generated in a vertical direction upon execution of image compression processing, and a second filter processing means for performing said filter processing operation using a horizontal block filter for removing block noise generated in a horizontal direction upon execution of image compression processing.

7. The device according to claim 1, wherein the plurality of filter processing means are parallel filter processing means.

8. The device according to claim 1, wherein the plurality of filter processing means comprises:

a first filter processing means for performing said filter processing operation using a filter for contour correction processing, and a second filter processing means for performing said filter processing operation using a filter for image quality improvement to emphasize a pattern part on the surface of an object, wherein the first filter and the second filter are high-pass emphasizing type filter which emphasize a region where a luminance value changes drastically.

9. The device according to claim 1, wherein the plurality of filter processing means comprises:

a first filter processing means for performing said filter processing operation using a filter for correcting mosquito noise, and a second filter processing means for performing said filter processing operation using a filter for correct block noise.

10. The device according to claim 9, wherein:

the first filter comprises an $\epsilon$ filter, and the second filter comprises a smoothing filter.

* * * * *